United States Patent
Baehring et al.

(10) Patent No.: US 7,578,323 B2
(45) Date of Patent: *Aug. 25, 2009

(54) CONTAINER FOR THE SAFE STORAGE OF A DANGEROUS LIQUID

(75) Inventors: Albrecht Baehring, Waldenbuch (DE); Johannes Blanke-Bohne, Bochum (DE); Reinhold Marquardt, Gelsenkirchen (DE)

(73) Assignee: Thixo II GmbH, Bochum (DE)

( * ) Notice: Subject to any disclaimer, the term of this patent is extended or adjusted under 35 U.S.C. 154(b) by 424 days.

This patent is subject to a terminal disclaimer.

(21) Appl. No.: 11/407,598

(22) Filed: Apr. 19, 2006

(65) Prior Publication Data

US 2006/0231469 A1    Oct. 19, 2006

(30) Foreign Application Priority Data

Apr. 19, 2005    (DE) ............... PCT/DE2005/000716

(51) Int. Cl.
*B65B 1/04*    (2006.01)
(52) U.S. Cl. .................... 141/104; 141/67; 141/69; 141/231
(58) Field of Classification Search ............ 141/67, 141/69, 100, 104, 231, 285, 286, 363, 383; 220/560.3, 564; 137/351
See application file for complete search history.

(56) References Cited

U.S. PATENT DOCUMENTS

| 4,857,111 | A | 8/1989 | Haubennestel | |
|---|---|---|---|---|
| 2006/0231160 | A1* | 10/2006 | Blanke-Bohne et al. | ..... 141/374 |
| 2006/0231560 | A1* | 10/2006 | Blanke-Bohne et al. | ..... 220/560.02 |

FOREIGN PATENT DOCUMENTS

| DE | 2813449 | 10/1979 |
|---|---|---|
| DE | 200 11 086 U1 | 12/2000 |
| EP | 0 240 248 A | 10/1987 |
| EP | 0 282 193 A | 9/1988 |
| FR | 1 391 004 A | 3/1965 |

* cited by examiner

*Primary Examiner*—Timothy L Maust
*Assistant Examiner*—Jason K Niesz
(74) *Attorney, Agent, or Firm*—Walter A. Hackler

(57) ABSTRACT

A container (10) for storing a liquid with a device (11, 12) for feeding one or more substances thixotroping the liquid to the liquid in the container (10) is characterized in that the device (11, 12) is designed so that it feeds the thixotroping substance or substances to the liquid in the container (10) as a result of a signal from a signal transmitter, so that the liquid completely thixotropes, at least in a closed outer layer inside the container (10) that cannot be penetrated by a residue of the liquid, not thixotroped if necessary. This ensures that by simple means the liquid present in the container (10) is pretended from being discharged or from escaping under certain defined conditions, particularly in emergency situations.

12 Claims, 5 Drawing Sheets

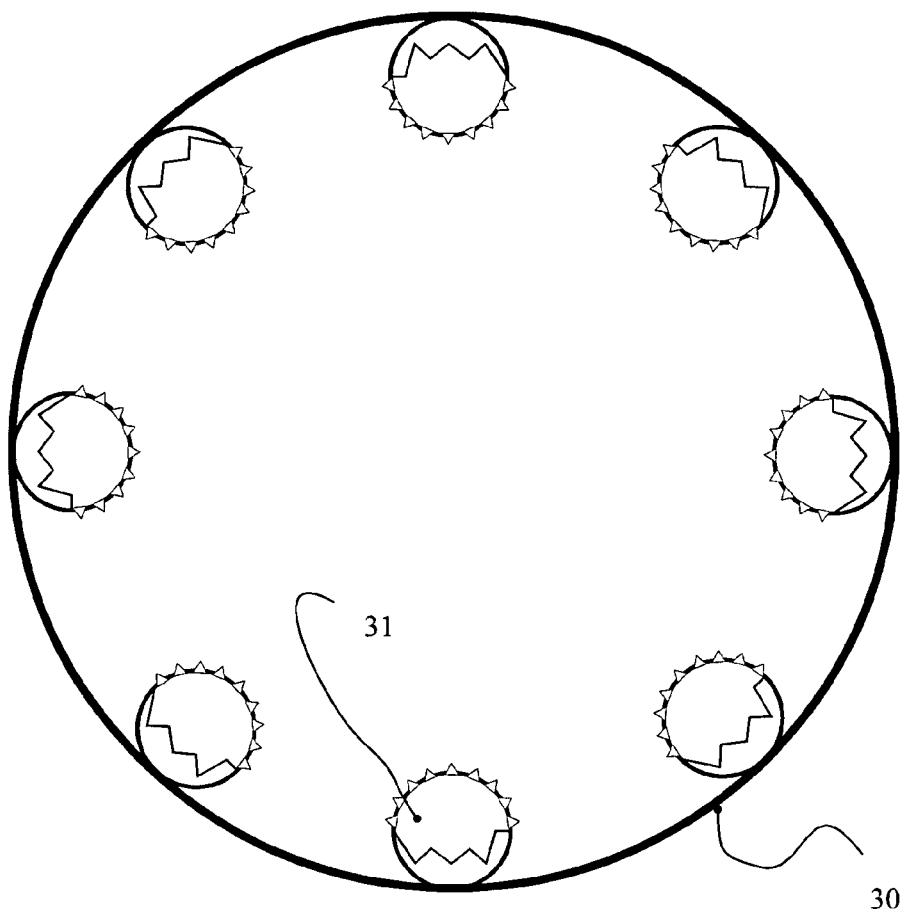
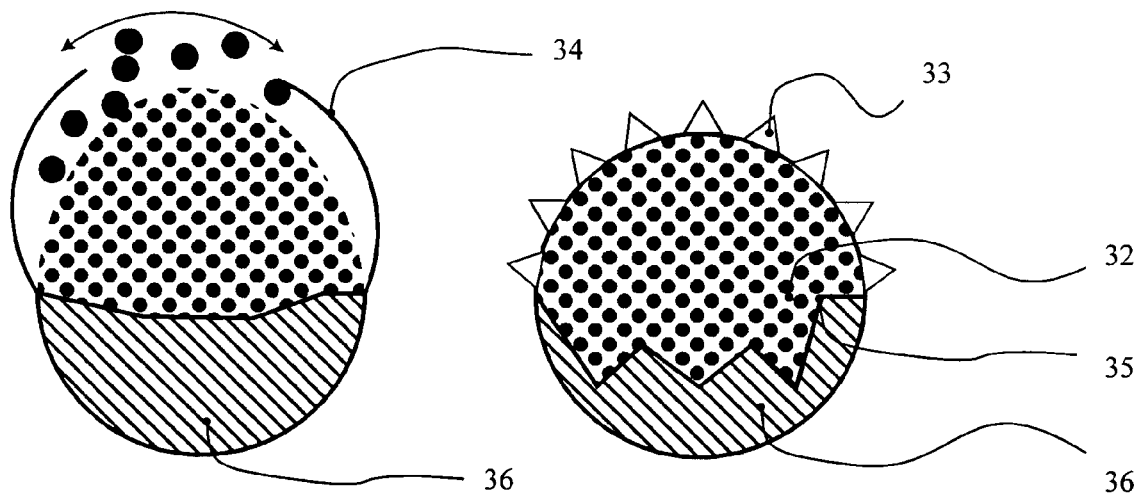
Fig. 3a
Fig. 3b         Fig. 3c

CONTAINER FOR THE SAFE STORAGE OF A DANGEROUS LIQUID

This application claims Paris Convention priority of PCT/DE 2005/000716 filed Apr. 19, 2005 the complete disclosure of which is hereby incorporated by reference.

BACKGROUND OF THE INVENTION

The invention relates to a container for the storage of a liquid with a device for feeding one or more substances thixotroping the liquid to the liquid in the container.

Containers with a device for feeding thixotroping substances are used in the chemical industry when liquids are to be solidified by the addition of a suitable agent (thixotropy) without any major temperature variation being required as in the case of solidification by freezing. A 2-component adhesive is similarly solidified, for example, but in this case the solidifying component is a hardener which gives rise to a generally irreversible solidification as a result of a chemical reaction with the first component, whilst in thixotropy solidification is caused by physical interaction of the components, which can also be reversed (re-liquefaction). DE 37 06 860 C2, for example, describes a thixotropic preparation using highly dispersive silicon oxide.

The handling of liquids in daily life may be associated with different risks. For example, an accident during the transport of dangerous liquid goods generally results in the dangerous goods escaping from the container, and diversely contaminating the environment over a large area. In the case of combustible liquids an explosive flame may develop. DE 28 13 449 A1 discloses a device for sealing leakage points on tanks in which the medium escaping from the leakage point is solidified by means of a coolant by freezing the medium. However, the medium to be solidified must in this case be cooled to below its melting temperature. A thixotropy, i.e. rapid solidification of the dangerous liquids, could in such emergencies contribute to preventing disasters. The same also applies to the prevention of a fire or explosion of a fuel tank in vehicles which have been involved in an accident or to the prevention of environmental damage in the event of damage to a tanker at sea. A further example that could be mentioned is the accidental leakage from a slurry tank and the resultant environmental pollution. Here too a more serious disaster could be avoided with the targeted initiation of a thixotropic "reaction". Even in the case of intrinsically harmless liquids, such as beer or wine, in a drink cellar, it may possibly be advantageous to prevent undesirable escape in large quantities from the container concerned, for example a barrel or tank, quickly and effectively.

It is therefore the underlying object of this invention to modify a container of the type already described with the simplest possible agents so that the liquid contained in it is prevented from being discharged or from escaping under certain defined circumstances.

SUMMARY OF THE INVENTION

This object is achieved in accordance with the invention in that the device in the container is designed so that it supplies the thixotroping substance or substances to the liquid in the container, due to a signal from a signal transmitter, so that the liquid is completely thixotroped, at least in a closed outer layer inside the container that cannot be penetrated by a residue of the liquid that is possibly not thixotroped. This layer may extend throughout the entire inner surface of the container, but possibly also over an intrinsically closed partial area, for example as a sealing surface or plug at a point where the container is damaged from the outside. Variants in which partial areas of the liquid are thixotroped in the volume of the container are also conceivable, possibly in the form of solid honeycomb structures inside the residual liquid.

This can, for example, safely prevent combustible, explosive, toxic liquid, or liquid that otherwise pollutes the environment, from no longer escaping from the container in defined situations when the corresponding signal from the signal transmitter is present, since it is solidified, at least in its outer layer, by addition of the thixotroping substances. The thixotropy may instead also take place completely in the outer layer only by adding the inside of the fluid volume to the thixotroping substances, thereby solidifying it. This also prevents undesirable escape of the liquid from the container, but in this case the "through-reaction" inside the volume takes a much longer time than thixotroping the outer envelope only.

The modification of the container according to the invention is particularly advantageous if the liquid in the container is a dangerous product.

In an emergency, an accident can be prevented by means of the invention, particularly in the case of combustible and/or explosive liquids, but even if the liquid in the container is corrosive and/or toxic, particularly an acid, lye or liquid toxic substances. This also applies when the invention is used in the case of environmentally harmful, in particular soil and/or groundwater contaminating liquids, for example slurry, liquid softeners, solvents and the like.

So that the presence of an emergency or even a looming accident can be safely detected, the signal transmitter is connected to one or more sensors which are capable of detecting corresponding risk situations in the case of particularly preferred embodiments of the container according to the invention.

In the case of special developments of the embodiments the sensors are capable, depending on the application, of detecting positive or negative accelerations (e.g. in the event of a vehicle collision) and/or temperatures and/or temperature variations (e.g. at the beginning of a fire) and/or position changes of the container or liquid in the container (e.g. when the load in a transporter or tanker slides or is displaced) and/or variations in the liquid in the container or leakage conditions of the container and/or smoke or gas development in the area surrounding the container.

In a further advantageous embodiment of the container according to the invention, the signal transmitter is connected to a manual control element, particularly an emergency off transmitter, so that an operator can initiate the thixotropy "by hand" in an emergency.

A further preferred embodiment of the invention provides that the thixotroping substances are selected from the group of surface active metal oxides (=Aerosils®), in particular $SiO_2$ and/or $TiO_2$ and/or $Al_2O_3$ and/or $ZrO_2$ and/or $Fe_2O_3$. Generally pyrogenic silicic acids are regarded as amplifiers, i.e. metal oxides in pure form or as mixtures in the molecular plane or as fine particles.

The thixotroping substances may be present, according to the application, in the form of powder, emulsion, gel, paste and/or a suspension. Finely divided surface-active solids with a particle size of less than 0.1 mm, preferably under 0.05 mm, are used in particular as thixotroping substances. The free area of these particles is between 20 and 600 $m^2$ per gram of the substance. In this case the surface of the particles contains chemical groups which are capable of interacting with other substances. These groups may be part of the particles themselves, or may even be external substances which are either coupled solidly to the particles and are also associated by polar forces with the particles.

A particularly preferred embodiment of the container according to the invention provides that the thixotroping substances are present in close spatial association with one or more carrier agents.

In the case of advantageous developments of this embodiment, the carrier agents may be designed as packaging for the thixotroping substances, the packaging automatically dissolving on contact with the liquid in the container.

In further developments the carrier agents are designed, in particular, as textile mats, cushions, sponges or non-woven fabrics in which the thixotroping substances are absorbed.

Alternatively, however, the thixotroping substances may also be present as tablets, chips or granulate.

The introduction of thixotroping substances into the liquid in the container may take place mechanically, electrically, magnetically or pneumatically, for example by gas pressure, by means of pumps or other suitable devices.

To achieve a rapid, comprehensive thixotropic reaction when necessary, it is advantageous for the device for feeding the thixotroping substances to incorporate an attachment for distributing the thixotroping substances in the liquid in the container under the influence of an external force.

The distributing attachment may, in certain embodiments, consist of one or more initially closed envelopes in which the thixotroping substances are arranged so that they are fed to the liquid in the container when the envelope is opened.

What is particularly advantageous is a development in which the envelope is freely movable in the liquid inside the container and is provided with sensorics and an automatic control device. The envelope can therefore move around in the liquid in the nature of an automatic submarine and effectively distribute the thixotroping substances.

In embodiments supplementary or alternative to this, the device for distributing the thixotroping substances incorporates a stationary pipe and/or nozzle system arranged in the container, where, in the presence of a signal from the signal transmitter, the thixotroping substances are fed into the liquid in the container by means of pressure gradients. The nozzles or outlet openings of the pipes are preferably arranged on the insides of the container walls so that at least a closed outer layer of thixotroped substance can be produced in the manner of a cocoon or encapsulation from a residue of the liquid that is possibly not thixotroped.

Since great speed is required in emergency situations to prevent a major accident, the device for feeding thixotroping substances to the fluid in the container and/or the nature and particle size of the thixotroping substances, is chosen in particularly preferred embodiments of the invention so that when a signal from the signal transmitter is present, thixotropy of the liquid takes place in a closed outer layer in less than one hour (for example after damage to a tanker at sea), and in particular in less than 5 minutes (for example, when a leak from a larger tank commences), but preferably in less than 2 seconds (in the case of road traffic accidents).

As already mentioned, the completely thixotroped closed outer layer may extend inside the container throughout the entire inner surface of the container in certain embodiments of the invention.

In alternative embodiments, the completely thixotroped closed outer layer may extend inside the container extend over an intrinsically closed partial area of the inner surface of the container, particularly as a sealing surface or plug at a point where the container is damaged. The thixotropy of the liquid in the container is therefore carried out specifically where it is needed.

Embodiments of the invention have also been mentioned above in which the device for feeding thixotroping substances is designed so that the spatial partial areas of the liquid in the volume of the container can be thixotroped, particularly in the form of solid honeycomb structures within the residual fluid. For example, sufficient inner stability can therefore be imparted to a container that has run aground on a reef to prevent it from breaking up and sinking in rough sea. The liquid cargo can therefore be prevented from escaping using the methods described above.

The container according to the invention may also be arranged stationarily, instead of on or in a vehicle, for example a chemical tank in a factory or a large slurry tank on a farm. The container may be open at the top or designed as a closed tank.

A variant of the container according to the invention in which one or more adhesive agents are added, is particularly preferred. This gives rise to permanent adhesion of the thixotroped layer on the corresponding inner surface of the container, thus ensuring that no fluid is able to escape from the inside of the container.

In advantageous developments of this embodiment, adhesive agents such as polyalcohols and/or polysaccharides and/or polycarbonic acids and/or their salts and/or esters of the inorganic acids, in particular esters of the acids of sulphur and/or phosphorus, may be provided.

The container according to the invention may be connected permanently or detachably to a land vehicle, water vessel or aircraft.

In a particularly preferred development of these embodiments, particularly in connection with motor vehicles, the signal transmitter may be a device for releasing an airbag system of the vehicle, in which case simply the releasing signal for the airbag, which by definition is of course an indication of an accident involving a collision of the vehicle, is at the same time used as an emergency signal for triggering the thixotropic reaction.

In a further, especially preferred embodiment of the invention, the container comprises a multitude of tanks which may be separated from each other and/or communicating with other tanks of the container.

In order to be able to reverse the thixotropy in the particular application, if necessary, a device for feeding surface-active agents, particularly tensides, is provided in a particularly preferred embodiment of the container according to the invention, for re-liquefaction of thixotroped material.

For the re-liquefaction of thixotroped material in the container an agitator and/or a centrifugal device may be provided. The transport of thixotroped material can be performed using a conveying screw, an extruder or a similar device.

A filtering means is provided for the recovery of the thixotroping substances and/or the surface-active agents from re-liquefied thixotroped material as well as for cleaning the re-liquefied material.

It is of further advantage to provide a measuring means for the detection of the amount and/or the volume of not thixotroped liquid in the container. On the one hand this may be used to monitor whether and to what extent thixotropy of the liquid in the container has taken place and/or should be continued. On the other hand in case of a re-liquefaction the re-liquefied amount of the solidified matter may be determined.

To visualize the measurement results an indicator device for indicating the amount and/or volume of the non-thixotroped liquid in the container may be provided.

In a particularly preferred development of the above embodiments a control means for actuating or controlling the device for feeding surface-active agents is provided which monitors a predetermined minimum reserve level of non-thixotroped liquid inside the container and triggers the re-liquefaction of thixotroped material if the liquid inside the container is sinking below the predetermined minimum reserve level.

In this context a method for operating the inventive container is advisable which is characterized in that the container is filled with liquid, that a partial amount of the liquid in the container is subsequently thixotroped except for a remaining predetermined minimum reserve of non-thixotroped liquid inside the container, and that in case of removing liquid from the container re-liquefaction of thixotroped material is effected such that the predetermined minimum reserve level of non-thixotroped liquid inside the container is kept approximately constant or is restored. In this way the content of a fuel tank in motor vehicles, ships or aircraft may be handled: After the loading of the tank with liquid fuel which is known to be an ideal accelerant possibly entailing in an accident the most horrific consequences for passengers and the environment, the bulk of the liquid fuel is being instantaneously thixotroped such that imminent dangers are considerably reduced. Since the craft's engine, however, must be kept (and stay) in an operational condition all the time the method described above makes sure that a sufficient quantity of liquid fuel is always present in the tank. Whenever the level of the thixotroped fuel falls below the minimum reserve the tank will have to be re-loaded as necessary. As a rule, in this mode of operation the tank will be configured to consist of several individual tanks communicating with each other for the different liquid-state and/or solidified phases of the tank contents.

An alternative exists in that there is a method for operating an inventive container characterised in that when a signal from the signal transmitter is present the liquid in the container is completely thixotroped. The liquid, e.g. may be the fuel in the tank of the vehicle, and the event triggering of the signal may be an accident. Thereby at least a more serious incident, such as a fire or an explosion, may be prevented.

What is of major significance, economically, is a method variant in which the thixotroped substance is subsequently re-liquefied, if applicable, after a time interval has elapsed, such that at least the bulk of the liquid may be re-used.

A method variant may be preferred in which the liquid is partially thixotroped, prophylactically, even before a signal is transmitted from the signal transmitter. This is recommended, for example, during the planned transport of hazardous goods, viz., after the loading of a tanker, or in the operating mode already described above, of on-line re-liquefaction of fuel in the vehicle tank which had been thixotroped as a precautionary measure.

In a specific method variant the liquid is homogeneously partially thixotroped, increasing the viscosity of the liquid, which on the one hand makes leakage considerably difficult and delays it in an emergency, in contrast to the volatile condition, and on the other hand decisively shortens the time required for "through-reacting", i.e. the carrying out of complete thixotropy when a dangerous situation arises, which will be indicated by the signal from the signal transmitter.

An alternative is characterised in that an outer solid layer is produced as a result of the partial thixotropy of the liquid, which layer surrounds a core of residual liquid. This would, for example, certainly create a "third envelope" in the case of a modern double envelope tanker, which provides, for example, additional protection against an environmental disaster due to leaking oil or the like if the tanker runs aground on a reef.

A method variant in which the container is filled with liquid, complete or partial thixotropy of the liquid in the container is subsequently carried out by actuating the signal transmitter, the container is freighted to a destination spatially distant from the place of filling, the thixotroped substance is re-liquefied, and the liquid drained from the container, is suitable as a standard method for the transport of liquid hazardous goods.

Finally, another advantageous variant of the inventive method, for operating an inventive container, is characterised in that the container is filled with liquid and full thixotropy of honeycomb-shaped partial areas of the liquid in the container, particularly of solid hexagonal honeycomb structures, is subsequently effected by actuating the signal transmitter. As mentioned above, this may impart to a tanker that has got into distress, for example, sufficient inner stability to prevent the full from breaking up and the vessel from sinking.

Further advantages of the invention can be extracted from the description and the drawing. The features mentioned above and below can be used individually or collectively in arbitrary combination. The embodiments shown and described are not to be understood as exhaust enumeration but have exemplary character for describing the invention.

BRIEF DESCRIPTION OF THE DRAWING

FIG. 3*a* shows a variant of the invention, with a pipe system;

FIG. 3*b* shows an opening pipe section from the variant according to FIG. 3*a*;

FIG. 3*c* shows another variant of the invention;

DESCRIPTION OF PREFERRED EMBODIMENTS

An emergency may be detected automatically by suitable sensorics (e.g.: acceleration transducer, position indicator etc.), or such detection may also be initiated by a person, by pressing a button (emergency off). The emergency detection system is integrated in the on-board computer of the container monitoring system (if possible an independent computer unit). From here the release process is transmitted to the intelligent part of the thixo variants, possibly by remote control. The adjusting and switching units are subsequently actuated and the thixotropy process started.

Dangerous goods container

Dangerous goods containers or containers may include all stationary and moving systems in which dangerous goods are stored. Examples: road tankers, rail tank cars, fuel tanks in motor vehicles, ships and aircraft, tankers in ocean-going and inland shipping, fuel oil tanks, and storage tanks for dangerous goods.

Thixotropic material

Thixotroping substances are capable of solidifying liquids to prevent leakage or undesirable dispersal over large areas or spaces in the surrounding environment. Thixotroping substances are present in the form of dust, but may also be mixed in liquids.

Re-liquefaction and surface-active agents

Surface-active agents are capable of converting solidified liquids to their original liquid form by thixotropy. The thixotroping substances and surface-active agents supplied may be regained in the process by filtration or distillation, for example.

Thixo mats

These act as carriers of thixotroping substances. They may be pressed in dry or may already be saturated in liquid form. The mats may be manufactured of plastic—unwoven fabric. They may be interspersed with plastic filaments or thin metal wires or meshes, thereby enabling the tensile stress to be increased. Thixo mats can be rolled, folded and may conceivably be in the form of an "endless belt".

A special embodiment comprises mats with small capsules with thin plastic skins (cf. blister film for packing purposes), which are destroyed by a build-up of released pressure, in order to release the thixo agent. This enables the agent to be distributed specifically. Capsules with skins which dissolve in the dangerous goods are also conceivable.

Folding thixo mats

If thixo mats are to be given geometric stability, e.g. because they are to be folded, the mat is provided with a metal frame having desired mechanical properties (e.g. foldable or movable by means of a pull rope).

Figure 1:
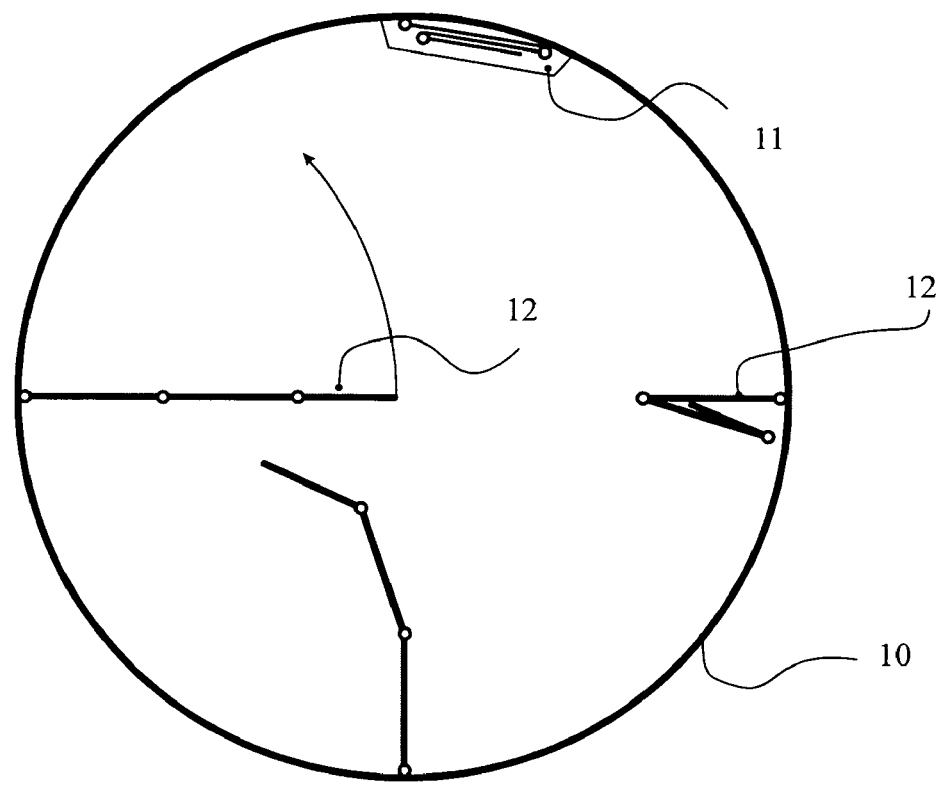
FIG. 1 shows an embodiment of the container according to the invention with closed pocket and folding thixo mats.

Pocket variant (FIG. 1)

As shown diagrammatically in FIG. 1, pockets 11, in which folding thixo mats 12 are housed in the folded condition, are fitted to the wall of a container 10. In case of danger pockets 11 open and folding thixo mats 12 unfold, according to how many folding mats are required to reach the middle of the container. During the folding process the thixo agents are released to the dangerous goods and are therefore distributed as homogeneously as possible in the dangerous goods.

Figure 2:
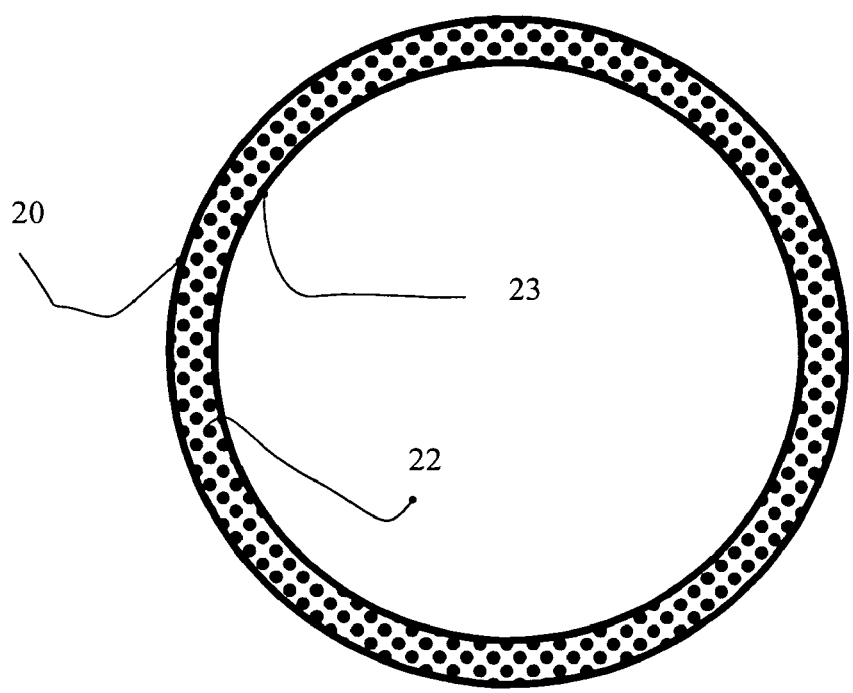
FIG. 2 shows a variant of the invention with a double envelope container.

Double container variant (FIG. 2)

The wall of a container 20 shown in FIG. 2, generally of a container, is of a double-wall design. Here the inner wall 23 may possibly consist of plastic. Thixo material 22 is inserted in the intermediate space between the two walls. In the case of local damage (attack or puncture with lance-shaped objects), the locally limited area is advantageously solidified by the thixo agents 22 in the manner of a plug.

Pipe system variant (FIG. 3a-c)

This variant is shown diagrammatically in FIGS. 3a to 3c, and is considered mainly for newbuilding of tank containers. A split pipe 31 contains a flexible diaphragm 35 in the longitudinal direction. Diaphragm 35 separates a high pressure section 36 from a magazine section for thixo agent 32. Nozzles 33 can inject thixo material 32 in different directions into the dangerous goods at certain distances. Diaphragm 35 may generally already be under a certain initial tension, so that in the high pressure section 36 a slight increase in pressure is all that is needed to force thixo material 32 through nozzles 33. Nozzles 33 are only opened if a certain initial pressure is exceeded, then remain open. They may possibly re-close with a certain hysteresis, or they have a return characteristic. The pipe distribution is adapted so that a fixed jacket is formed around any liquid inner core that may remain.

A further variant of the pipe system, not shown in the drawing, is constructed so that two pipes (or partial pipes), one lying inside the other, disclose empting slots by rotation (e.g. ¼ turn, spice spreader principle).

Here too thixo agent 32 may be kept under initial pressure by a flexible diaphragm 35.

However, it is also possible to fold up the magazine section, in which case thixo material 32 is forced out by diaphragm 35 under initial tension. In this variant, shown in FIG. 3b, pipe 31 is provided with a folding outer wall 34 instead of nozzles 33 shown in FIG. 33.

Figure 4:
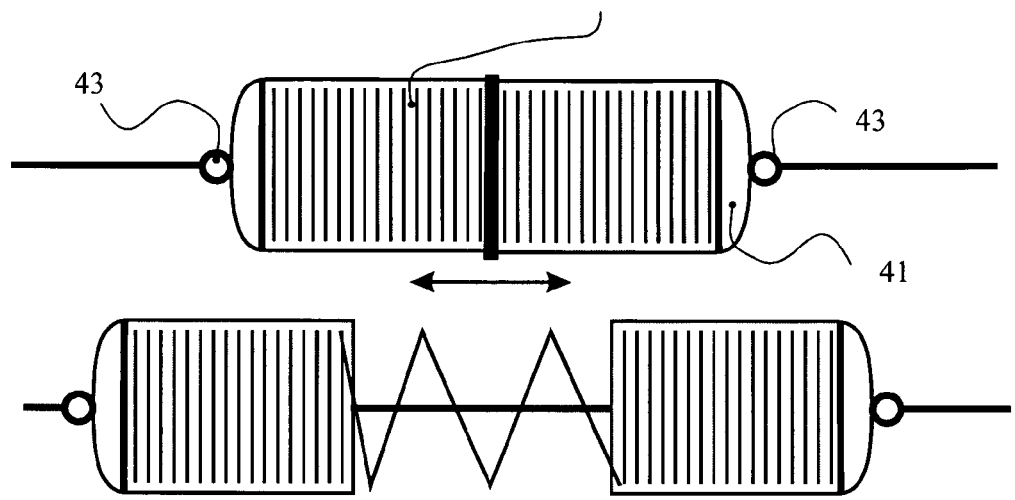
FIG. 4 shows a variant of the invention with separating envelopes in the closed condition (top) and in the open condition (bottom)
Figure 5:
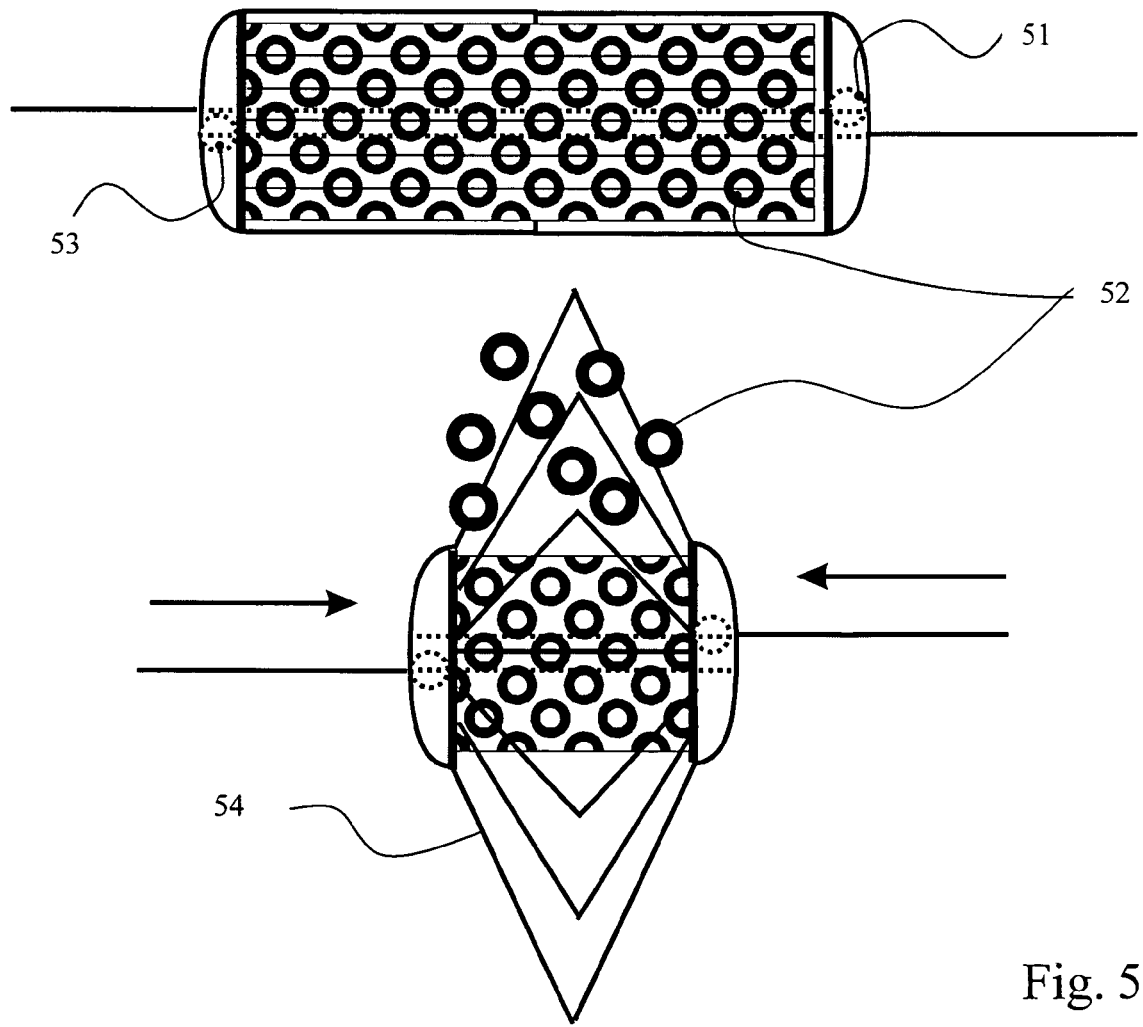
FIG. 5 shows a variant of the invention with an articulated sleeve in the closed condition (top) and in the open condition (bottom)

Sleeve variants (FIGS. 4 and 5)

The advantage of this variant is that very few conversion measures are required on the container installations.

As shown in FIG. 4, endless thixo mats 42 can be accommodated in a split sleeve 41, folded and pressed. Both sleeve chambers may be of the same or different sizes. However, it may also be appropriate to form only one chamber, this being dependent on the point of installation in the dangerous goods container.

Thixo sleeve 41 may be pulled by means of lugs 43 with a pull rope horizontally through the dangerous goods (or may move by its own drive on the rope). Here sleeve 41 opens (e.g. by generating pressure with nitrogen tablets), and the stack of thixo mats 42 is peeled off and in doing so distributes the thixo agent in the dangerous goods. A drive may be installed in the head of sleeve 41, which drive moves sleeve 41 automatically on the rope. The drive may be achieved electrically (battery), but also pneumatically, in which case the pressure required can be generated by nitrogen tablets, for example.

Thixo sleeve 41 may, however, also be allowed to drop vertically through the dangerous goods. Here a head of sleeve 41 is secured by an adhesive magnet or on one of lugs 43 on the tank container, and detached from the main section of sleeve 41 (e.g. bayonet closure or screw connection). The second sleeve section, with thixo mat stack 42, is allowed to drop into the dangerous goods. The associated sleeve head may contain a falling weight to accelerate this process. The stack is peeled off during falling and distributes the thixo agent evenly. No structural measures on the container are required for this application.

Both of the variants above may also be designed so that several sleeves 41 are fitted on a rope, which sleeves are all opened at the same time by pulling.

If no thixo mats 42 are to be used, the thixotroping substances (thixo dust or liquid) may also be forced out by a ram (two ropes pulled in opposite directions).

Another construction of sleeve 51, shown in FIG. 5, may be designed so that the jacket of sleeve 51, perforated in strips, for example, breaks open on the outside due to pressure (articulated sleeve), by shortening the cylindrical axis and collapsing strips 54 formed. However, the breaking open of such a sleeve 51 may also be triggered by igniting nitrogen tablets (generation of inner pressure, bursting sleeve). Sleeve 51 may be again conveyed through the container by a rope fitted to a lug 53.

Figure 6:
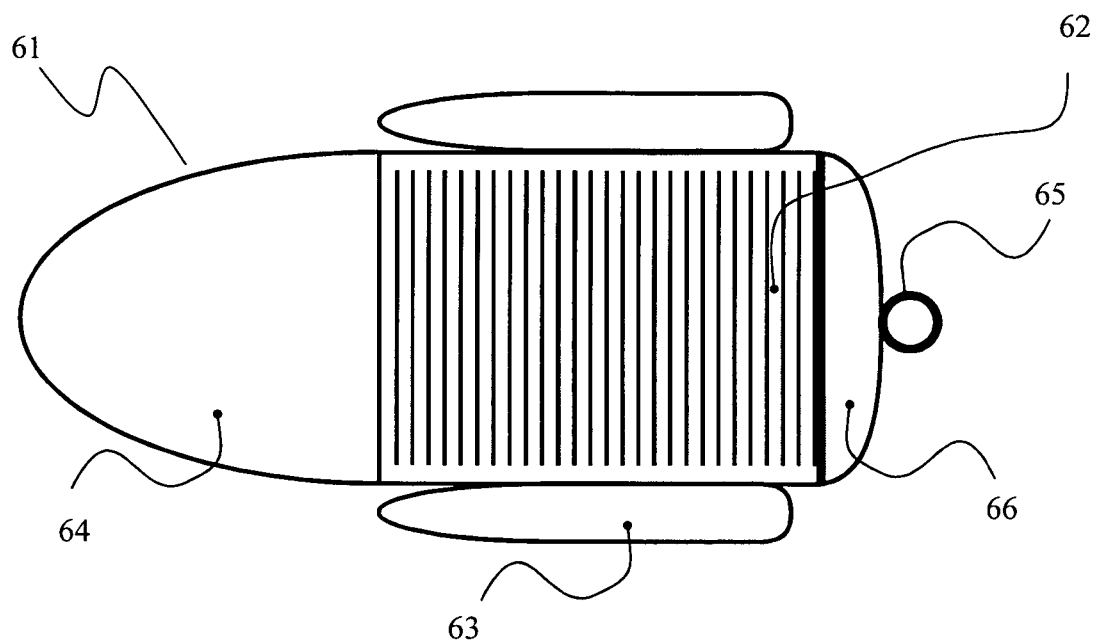
FIG. 6 shows a variant of the invention with a submarine-type immersion device.
Figure 7:
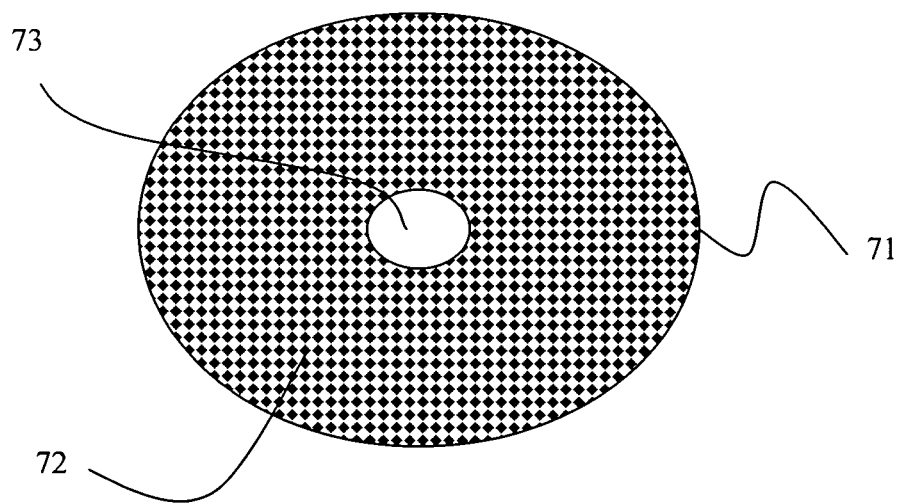
FIG. 7 shows a variant of the invention with a falling weight in a ball-shaped envelope.
Figure 8:
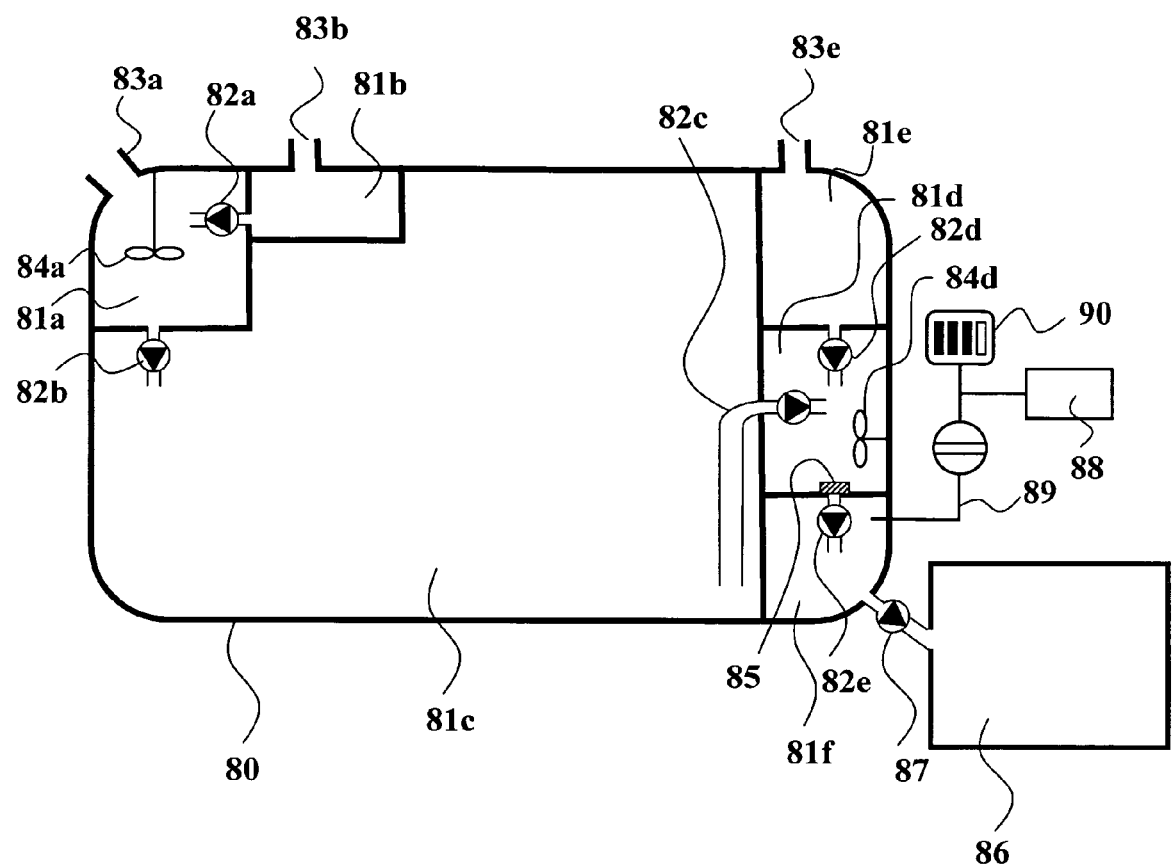
FIG. 8 shows a variant of the invention with on-line re-liquefaction of prophylactically thixotroped fuel.

"Submarine" variant (FIG. 6)

A further variant is a sleeve-shaped submersible device 61 moving independently, shown in FIG. 6, which device is navigated on online calculated trajectories through the dangerous goods. Here sensorics, electronics and a microcontroller are required, represented diagrammatically as control head 64. The "submarine" must have its own drive and must be manoeuvrable in all directions. The drive and steering unit are denoted by lateral fins 63. The sensorics must be able to record their on position and the geometry of the container. This variant is appropriate when very large containers (ship cargo) are to be inoculated with thixo agents. In the embodiment shown, endless non-woven fabric mats 62 are provided with pressed-in thixo agent in submersible device 61.

In other embodiments the "submarine" may also be fitted on rear cover 66 with nozzles, the thixo material being ejected in the form of dust or a liquid. A fixing lug 65 on rear cover 66 may serve for docking.

Here too no structural modifications to the container are required. The "submarine" may be used flexibly because it is transportable. If, for example, an oil tanker gets into distress, such a "submarine" may still possibly be deployed by helicopter.

Ball variant with falling core (FIG. 7)

Finally a further extremely simple variant comprises a ball-shaped capsule 71, which is filled with thixotroping substances 72, and carries inside a heavy falling core 73, which allows capsule 71, after it has been thrown in, to drop relatively quickly down through the liquid in the container, initially because of the gravitation, in which case capsule 71 is able to release thixo material 72 into the surrounding liquid in the container.

Variant with on-line re-liquefaction in the fuel tank (FIG. 8)

FIG. 8 shows a particularly advantageous variant of an inventive container 80, comprising a multitude of tanks 81*a*, 81*b*, 81*c*, 81*d*, 81*e*, 81*f* communicating with each other. This variant primarily serves the purpose of thixotroping, particularly prophylactically, the fuel of a land vehicle, water vessel or an aircraft, for example, in order to minimize an imminent explosion during an accident.

The tanks 81*a*, 81*b*, 81*c*, 81*d*, 81*e*, 81*f* are interconnected by conveyor devices 82*a*, 82*b*, 82*c*, 82*d*, 82*e*. Here pumps, screw conveyors, suction assemblies or similar devices may be used. The container 80 comprises a multitude of inlet pieces 83*a*, 83*b*, 83*e*, by means of which various substances (fuel, thixotroping substances and surface-active agents) may be filled into tanks 81*a*, 81*b*, 81*e* provided for this purpose. The fuel is filled into the first tank 81*a* of the container 80 through inlet piece 83*a*. By means of conveyor device 82*a* the thixotroping substances are conveyed into the first tank 81*a*, in which the thixotroping fuel is present, from tank 81*b*, in which the thixotroping substances are kept. An agitator 84*a* provides for the thorough blending of the fuel and of the thixotroping substances such that an even thixotropy of the fuel, preferably in the form of a viscous paste, is carried out. The fuel thixotroped in this mode is transported into main container 81*c* by way of conveyor device 82*b*. So the fuel present in tank 80 may be moved without risk.

Since, to operate the vehicle, a minimum quantity of approximately 1 to 5 liters of liquid fuel must be present, however, the inventive container 80 is configured such that a re-liquefaction of the thixotroped fuel, in particular during the operation of the vehicle, may be made. This re-liquefaction is made in tank 81*d*. For this purpose the thixotroped fuel is sucked or pumped into tank 81*d* via conveyor device 82*c*. Additionally, surface-active agents are fed from tank 81*e* into tank 81*d* by means of conveyor device 82*d*. Re-liquefaction is made due to a chemical reaction by blending the thixotroped fuel with a surface-active agent which blending may be optimized, for example, using an additional agitator 84*d*. The re-liquefied fuel may now be fed by means of conveyor device 82*e* into tank 81*f*. To recover the thixotroping substances and/or surface-active agents conveyor device 82*e* is provided with a filter device 85. The transfer of the re-liquefied fuel to engine compartment 86 of the vehicle is made by means of an additional conveyor device 87.

To monitor and control the conveyor devices 82*a*, 82*b*, 82*c*, 82*d*, 82*e* a control device 88 is provided which is connected to a measurement assembly 89 to measure the quantity and/or volume of non-thixotroped liquid in tank 81*f*, for example a liquid level measurement device and/or a volumetric flow rate measurement device. Thus either the quantity of liquid fuel may be kept constant or may be replenished to a predetermined reference level in case of its sinking below the minimum reserve level. The quantity of re-liquefied fuel available may be read and monitored by the driver in the interior of the vehicle via an indicator device 90 connected with the measurement assembly 89.

We claim:

1. A container for storing a liquid with a device for feeding one or more substances thixotroping the liquid to the liquid in the container, characterised in that the device is designed so that it feeds the thixotroping substance or substances to the liquid in the container, as a result of a signal from a signal transmitter, so that the liquid thixotropes, at least in a closed outer layer inside the container, that cannot be penetrated by a residue of the liquid, not thixotroped and a device for feeding one or more surface-active agents is provided for re-liquefaction of thixotroped material.

2. The container according to claim 1, characterized in that an agitator and/or a centrifugal device is provided for re-liquefaction of thixotroped material in the container.

3. The container according to claim 1, characterized in that a filtering means is provided for the recovery of the thixotroping substances and/or the surface-active agents from re-liquefied thixotroped material.

4. The container according to claim 1, characterised in that a measuring means is provided for the detection of the amount and/or the volume of not thixotroped liquid in the container.

5. The container according to claim 4, characterised in that an indicator device is provided for indicating the amount and/or the volume of not thixotroped liquid in the container.

6. The container according to claim 4, characterised in that a control means for actuating or controlling the device for feeding surface-active agents is provided which monitors a predetermined minimum reserved level of not thixotroped liquid inside the container and triggers the re-liquefaction of thixotroped material if the liquid inside the container is sinking below the predetermined minimum reserved level.

7. The container according to claim 6, characterised in that an agitator and/or a centrifugal device is provided for re-liquefaction of thixotroped material in tile container.

8. The container according to claim 6, characterised in that a filtering means is provided for the recovery of the thixotroping substances and/or the surface-active agents from re-liquefied thixotroped material.

9. The container according to claim 6, characterised in that the container comprises a multitude of tanks which may be separated from each other and/or communicating with other tanks of the container.

10. The container according to claim 9, characterised in that the liquid in the container is combustible and/or explosive, in particular fuel, that the container is designed as a closed tank and is connected permanently or detachably to a land vehicle, a water vessel or an aircraft, that an agitator and/or centrifugal device is provided for re-liquefaction of thixotroped material in the container, and that a filtering means is provided for the recovery of the thixotroping substances and/or the surface-active agents from re-liquefied thixotroped material.

11. A method for operating a container according to claim 6, characterised in that the container is filled with liquid, that a partial amount of the liquid in the container is subsequently thixotroped except for a remaining predetermined minimum reserved of not thixotroped liquid inside the container, and that in case of removing liquid from the container re-liquefaction of thixotroped material is effected such that the predetermined minimum reserved level of not thixotroped liquid inside the container is kept approximately constant or restored, completely.

12. The container according to claim 1, wherein the surface-active agent comprises tensides.

* * * * *